United States Patent [19]
Qian

[11] Patent Number: 5,502,585
[45] Date of Patent: Mar. 26, 1996

[54] OPTICAL TRANSISTOR

[75] Inventor: Dingrong Qian, Livermore, Calif.

[73] Assignee: Shanghai Institute of Technical Physics, Academia Sinica, Shanghai, China

[21] Appl. No.: 22,635

[22] Filed: Feb. 25, 1993

[30] Foreign Application Priority Data

Feb. 25, 1992 [CN] China ................................ 92108337.8

[51] Int. Cl.$^6$ ........................................................ G02F 3/00
[52] U.S. Cl. ............................ 359/108; 359/243; 359/244
[58] Field of Search .................................... 359/240, 241, 359/243, 244, 107, 108

[56] References Cited

FOREIGN PATENT DOCUMENTS 0187221  8/1988  Japan ...................................... 359/108

OTHER PUBLICATIONS

"New Light Modulation Device: Optical Transistor", Dingrong Qian, *Optical Engineering*, Mar. 1993, vol. 32, No. 3, pp. 542–546.

"Plasma Edge and its Application to Infrared Measurement and Detection", Dingrong Qian, *Journal of Applied Physics*, Sep. 1, 1993, vol. 74, No. 5, pp. 3061–3064.

*Primary Examiner*—Georgia Y. Epps
*Assistant Examiner*—Thomas Robbins
*Attorney, Agent, or Firm*—Burns, Doane, Swecker & Mathis

[57] ABSTRACT

The present invention relates to an optical transistor which uses photo-excited carriers to modulate the interaction between the plasma oscillation of free carriers and input electromagnetic radiation to change reflectivity by a large margin, thereby realizing high-speed light modulation, light switching and light detection. The device functions like a transistor, but uses a light beam instead of an electric current. The invention also provides implementation schemes for different devices using optical transistors such as a light power modulator, a combined detector, a reflective or transmissive light switch and a spectral scanner.

22 Claims, 3 Drawing Sheets

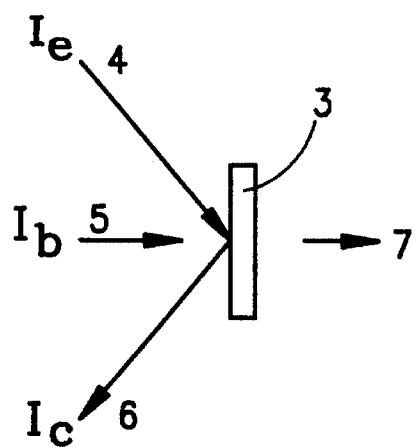
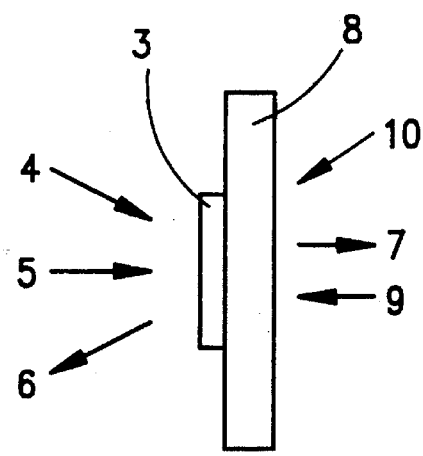
FIG. 2
FIG. 4
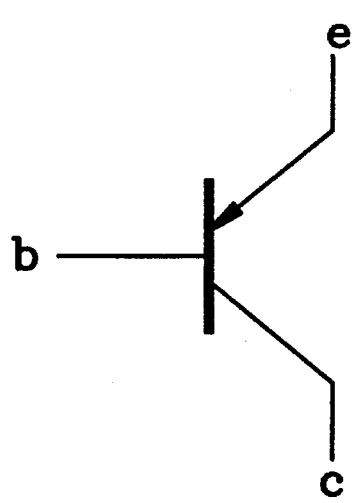
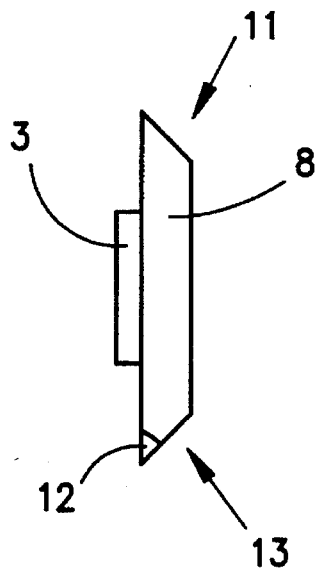
FIG. 3
FIG. 5

OPTICAL TRANSISTOR

BACKGROUND OF THE INVENTION

1. Field of the Invention

The present invention relates to light detection, light switching and light modulation and more particularly to an optical transistor that realizes high speed optical modulation, optical switching and optical detection.

2. State of the Art

A great variety of devices utilizing various physical principles have been produced and used for light modulation, light switching and light detection. For example, physical effects used by existing infrared light modulation devices include Faraday magnetic deflection, optical analysis of variation, and the Kèrr effect, all of which are realized by utilizing the variation of solid state optical properties under magnetic and electric fields. The manufacturing processes for such devices are all very complicated. For example, in Chinese Patent Application 92108312.2, entitled "New Measuring Method Of The Life of Nonequilibrium carrier" filed on Jan. 23, 1990 it was disclosed that the life time of carriers can be measured by using photo injection to move a reflection edge so as to make the incident light of another beam having a frequency on the reflection edge experience a drastic change in reflection from semiconductor surface. That principle can also be developed and applied in light modulation, light switching and light detection.

SUMMARY OF THE INVENTION

The object of the present invention is to provide an optical transistor that is simple to manufacture and convenient in operation. It can be utilized in high speed light modulation, light switching and light detection. Light modulation is realized by utilizing the change of an optical property of the semiconductor under light impingement. When the magnitude of modulation is large, the device can be used as a light switch. When the sensitivity of modulation is high it can be used for light detection.

In accordance with the present invention, a sensitive sample is made of the semiconductor material having a narrow or zero forbidden band which has flat surface and good reflectivity within the infrared wave band. The semiconductor can produce a concentration of dark carriers required to selectively reflect an input working beam. Coherent light with good monochromaticity or incoherent light with a continuous spectrum can be used as the bias beam to irradiate the sensitive sample. The plasma oscillation reflection edge of the sensitive sample is moved to and maintained at a required frequency position. Furthermore, a laser beam with a wavelength in the range from infrared to submillimeter wave band is used as the working beam to irradiate the sensitive sample, and the light spot of the working beam is oriented to cover an area within the light spot of the bias beam. The steep frequency characteristic of a plasma oscillation reflection edge, and the moderate variation of the intensity of the bias beam are utilized to cause the intensity of the reflected beam or the transmitted beam to be sensitive to such variations, such that high speed light modulation, light switching and light detection can be realized.

BRIEF DESCRIPTION OF THE DRAWINGS

A brief description of the drawings of this invention is given as follows.

FIG. 2 is a layout of the optical transistor of this invention. In FIG. 2, $I_e$ denotes the intensity of the working beam 4; $I_b$ is the intensity of the bias beam 5; $I_c$ is the intensity of the reflected beam 6; and 7 is the transmitted beam.

FIG. 3 is an ordinary transistor, wherein the emitter, the base electrode and the collector correspond to the working beam $I_e$, the bias beam $I_b$ and the reflected beam $I_c$ respectively.

FIG. 4 is the layout of an optical transistor having a thin sample and a substrate 8.

FIG. 5 is the layout of an optical transistor where the bias beam is introduced from the normal directions 11 and 13 of the inclined lateral surface of the substrate.

DETAILED DESCRIPTION OF THE PREFERRED EMBODIMENTS

A detailed description of the invention is given as follows.

It is well known that there is a steep plasma reflection edge at the low frequency end of a semiconductor reflection spectrum. Conventionally, the reflection spectrum of the real part $\epsilon_1$ of the dielectric function within the range <0,1> is defined as the plasma reflection edge, or reflection edge for short. The position of this reflection edge is related to the plasma frequency $\omega_p$. The degree of the steepness of the reflection edge is related to the damping of the plasma oscillation, and the whole reflection spectrum $R(\omega)$ can be quantitively described by the classic oscillator model:

$$R(\omega) = \frac{(n-1)^2 + K^2}{(n+1)^2 + K^2} \quad (1)$$

$$\epsilon(\omega) = (n + iK)^2 = \epsilon_1 + i\epsilon_2 = \quad (2)$$

$$\epsilon_\infty + \sum_j \frac{S_j \omega_j^2}{\omega_j^2 - \omega^2 - i\Gamma_j \omega} - \frac{\epsilon_\infty \omega_p^2}{\omega^2 + i\gamma_p \omega}$$

$$\omega_p^2 = \frac{4\pi N_e e^2}{\epsilon_\infty m_s^*} \quad (3)$$

where, n and K are the reflective index and the extinction coefficient respectively, $\epsilon_1$ and $\epsilon_2$ are the real part and imaginary part of the dielectric function $\epsilon(\omega)$; $\epsilon_\infty$ represents the contributions of all the transition terms between different bands to the dielectric function; $\omega_j$, $S_j$ and $\Gamma_j$ are the oscillation frequency, intensity and damping terms respectively; $\omega_p$ and $\gamma_p$ are the plasma frequency and the plasma damping term respectively; $N_e$ is the concentration of the carrier; e is the electric charge of an electron; and $m_s^*$ is the mean effective mass of the energy band of the carrier.

Figure 1:
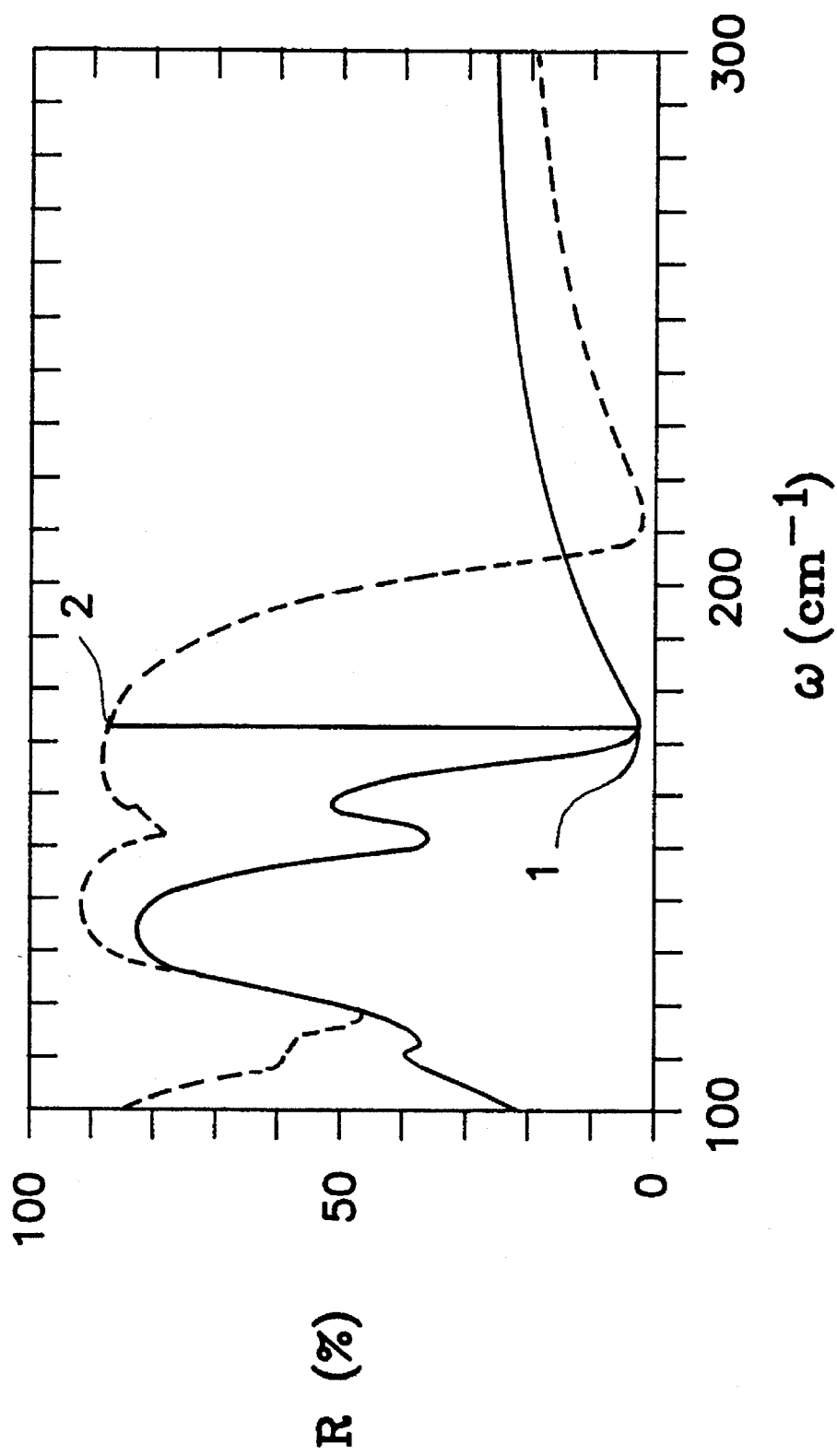
FIG. 1 is the reflection spectrum of HgCdTe (x=0.2) at 77K calculated from a classic oscillator model; the solid line and the dotted line correspond to a plasma frequency $\omega_p$ of 125 cm$^{-1}$ and 184 cm$^{-1}$ respectively.

In FIG. 1, the solid line is the reflection spectrum for a plasma frequency of 125 cm$^{-1}$ for HgCdTe(x=0.2) at 77 k, which can be simulated accurately by a classic oscillator model. Other parameters are listed in Table 1. The reflection spectrum has a minimum value Rmin at a frequency is $\omega$min of 174 cm$^{-1}$. When $\omega$min is much larger than the oscillating frequency, Rmin is close to zero, and at that time $\epsilon_1$=1. At the low frequency end of $W_{min}$, the reflective index rises sharply until it approaches total reflection, at which time ε=0.

The unique feature of this invention is that the concentration $N_e$ of the free carrier is correlated to the photocarrier, thereby the infrared radiation can be generated intrinsically and correlated to the frequency position of the reflection edge. Furthermore, by using the steep frequency characteristics of the reflection edge, the reflection edge is used to reflect an incident laser beam, thereby the variation of the intensity of the reflected laser is correlated to the movement of the frequency position of the reflection edge, which becomes a sensitive indication.

In FIG. 2, a beam of infrared radiation is used to modulate the incident laser beam. That is the bias beam 5, having intensity $I_b$, can generate photo-carriers, and the variation of $I_b$ will give rise to a corresponding variation in the intensity $I_c$ of the reflected laser beam. If such modulation is adequately sensitive and the intensity $I_e$ is strong enough, the magnitude of variation of $I_c$ will enormously exceed that of $I_b$. It is a very sensitive effect 0f the light modulation, and can also be regarded as a new method as well as a new device for detecting the infrared radiation. On the other hand, when the infrared radiation of bias beam 5 is very strong, the reflection edge will be moved by a large margin. This is shown by the dotted line in FIG. 1, where at that time, $\omega_p=184$ cm$^{-1}$. For the incident beam, the reflective index can vary from near zero to total reflection, such as moving from point 1 on the solid line to point 2 on the dotted line as shown in FIG. 1. In this sense, it is also a new method as well as a new device for light switching. The configuration in the sketch of FIG. 2 can be realized in a gas, vacuum, liquid or solid medium. The three beams, $I_e$, $I_b$ and $I_c$ can also be transmitted by optical fiber.

However, lasers usually emit only discrete frequencies. If it is intended to use a reflection edge to reflect a laser beam, a steady-intensity beam can be used as the bias beam to irradiate the sample for generating and retaining a constant number of photo-carriers, thereby moving the plasma oscillation reflection edge of the sensitive sample to the required frequency position. For many years, it has been shown that there is no Landau damping in a simple narrow band semiconductor, therefore after moving the reflection edge to a high frequency, the steepness of the edge will not be changed. This is a very important theoretical principle. For details please see Qian Dingrong L. Liu, W. Szuszkiewicz and W. Bardyszewski, Phys, Rev, B44, 5540 (1991).

If the reflection edge is moved to the required frequency position by a light beam and is kept steady and constant, we call this beam the background beam. In addition, an auxiliary beam is used to irradiate the sample and to generate photo-carriers to modulate or to switch the incident laser beam. The auxiliary beam can also be called the modulation beam or the switching beam. In an exemplary embodiment, the background beam and the auxiliary beam constitute the bias beam. The photon frequency of the background beam and that of the auxiliary beam may be different, but they must be able to generate photo-carriers in the sample, therefore their wavelength can be in a broad range from visible light to infrared. Of course, the auxiliary beam can be omitted, and the intensity of the bias beam itself can be switched between a lower intensity which is used to move the plasma reflection edge and to maintain it at the proper frequency position and a higher intensity which is used to modulate or to switch the optical transistor.

In FIG. 2 and FIG. 3, the functions of the light modulation and switch as shown are quite similar to a transistor, hence it is called an optical transistor. Of course, its physical base is not a PN junction, it is the interaction between the light and the plasma oscillation. The incident beam with an intensity $I_e$ can be called the input beam 4. The reflected beam 6 with an intensity Ic can be called the output beam. The optical transistor can work in a vacuum, gas, liquid or solid medium. All three beams may be propagated through these medium or through an optical fiber. Projecting the reflected beam on an infrared detector can compose a combined detector, and the function of the optical transistor is similar to that of an optical preamplifier.

The gain of the common emitter circuit is similar to that of an optical transistor, and can be used to describe the modulation gain of the light intensity of an optical transistor as $$\beta = \frac{dI_c}{dI_b} \quad \frac{d_R}{d\omega_p} \quad \frac{\omega_p I_e \eta \tau}{2\eta \omega_b A d N e}$$

where, $\omega_b$ and $I_b$ are the frequency and the intensity of the bias beam 5, $I_e$ is the intensity of the working beam 4, $I_c$ the intensity of the reflected beam 6, η the quantum efficiency of the modulation or the switch beam in bias beam, τ the relaxation time of the non-equilibrium photocarrier, A the light-irradiated area, d the intrinsic absorption length, $\hbar$ Plank's constant, $N_e$ the photocarrier density, R the reflectivity and $\omega_p$ the plasma frequency.

To maximize the modulation effects of the optical transistor, the frequency $\omega_e$ of the working beam just equals the frequency $\omega_1$ at which point $dR/d_{\omega p}$ reaches its maximum value. This frequency is slightly smaller than $\omega_{min}$. As τ is short at room temperature, a high speed switch can be made, while as τ is large at low temperatures, the high-sensitivity modulator can be made.

The reflection spectrum parameters, the physical parameters and the modulation magnification of the light intensity of the optical transistor under various concentrations have been calculated respectively for HgCdTe and HgSe samples at 77 k, and the results are listed in Table 2. The parameters used in the calculation are listed in Table 1.

From Table 2 it can be seen that for the material of HgCdTe(x=0.2) at 77K, it is very effective to use the modulating beam with wavelength $\mu_b$=10.6 μm and 8.49 μm to modulate the working beam of strong spectral line of a methanol laser with wavelength $\mu_e$=118.8 μm and 49.3 μm. The power variation of the output beam is 1812 times and 156 times that of the modulating beam respectively. Here it is assumed that the energy $\omega_e$ of the bias beam equals $E_f$ plus $E_g$, where $E_f$ is the Fermi energy level, $E_g$ is the width of forbidden band, and the powers of the working beam are 100 mW and 20 mW respectively. In addition, he output of the methanol laser can be increased. That is, a working beam with a wavelength of 118.8 μm and 49.3 μm can be used to sensitively detect the infrared radiation having a wavelength shorter than 10.6 μm and 8.49 μm.

In order to further illustrate the modulation effect of the optical transistor, both the photo-carrier density $dN_e$ and the bias beam power $dI_b$ must be increased to produce an increment of the reflectivity at $\omega_1$ of 1%, i.e., dR(ω)=1%. See Table 2 and Table 3 for sample calculations. When the powers $dI_b$ of modulating beams with photon energy being 0.0939+0.0246=0.1185 electron volt ($\lambda_b$=10.5 μm) and 0.0939+0.0521=0.146 electron volt ($\lambda_b$=8.49 μm) are 0.549 μW and 1.28 μW respectively, the increment of the density dNe of photo-carrier is $1.02 \times 10^{14}$ cm$^{-3}$ and $1.19 \times 10^{14}$ cm$^{-3}$, the reflectivity at $\omega_1$ can increase 1%, i.e., dR($\omega_1$)=1%.

The switch characteristics of the HgCdTe(x=0.2) optical transistor are given in Table 3 for $\omega_{min}$ equal to 90 cm$^{-1}$ and 214 cm$^{-1}$. In order to increase the reflectivity at $\omega_{min}$ from $R_{min}$ to 90%, it is necessary to inject photo-carriers to make the increments $\Delta N_e$ of the concentration be $3.56 \times 10^{16}$ cm$^{-3}$ and $8.84 \times 10^{16}$ cm$^{-3}$ respectively. This requires that the switch beam powers with wavelength $\lambda_b = 10.5$ μm and 8.49 μm be $\Delta I_b = 0.191$ mW and 0.59 mW respectively. This indicates that the switching characteristics of the optical transistor is quite sensitive.

In Table 3, the performance of the HgSe optical transistor at 77k is also calculated. The bias beam with a wavelength $\lambda_b = 3.77$ μm, 1.52 μm and 1.05 μm respectively have certain modulation effects on the working beam with wavelength $\lambda_e = \lambda_1 = 10.5$ μm, 5 μm and 3.6 μm. Also, any beam with wavelength shorter than the above mentioned $\lambda_b$ can be used as the modulating beam. As the required modulating power $\Delta I_b$ is relatively large, it cannot be used for detection of a weak infrared radiation. However, considering that there is a very strong laser beam at 1.06 μm and the 3.6 μm infrared is a very useful wavelength for optical fiber communication, the HgSe optical transistor should have a bright prospect for application.

In FIG. 2, sample 3 of the optical transistor device may comprise either a thin or thick sample, but the sample thickness $t_{pl}$ must be equal to or larger than $l^2/tpc$, where l is plasma absorption length and tpc the thickness of the photoconductive detector. There is no particular requirement on the shape of the sample but the surface should be flat and should have good reflectivity in the infrared band. The concentration of dark carrier in sample 3 should be close to the required density of the frequency of the working beam Ie so far as possible. For its value see Table 2. This can lower the demand for the power of the bias beam. For the similar carrier concentration, when the open forbidden zone semiconductor is used, the photon energy of the bias beam is larger than that of the zero forbidden zone semiconductor; therefore, either maybe selected in practical cases. As to the sample thickness, there is no requirement on the thickness of the sample, but the thickness of the thin sample should equal to or larger than the plasma absorption length. This absorption length is related to the concentration of the carrier. For the optical transistor in practical use, its value is about 100 μm. The thin sample is glued or grown epitaxially on the substrate 8. The substrate material and the gluing face should be transmissive for the bias beam and the working beam.

Some practical examples are described as follows:

1. Reflective light switch

As shown in FIG. 2 when a thick sample is used, the working beam 4 and the bias beam 5 irradiate the surface of the sample 3, with the incident angle smaller than the total reflection angle. The light spot of the bias beam 5 must be larger than that of the working beam 4. The reflected beam 6 is reflected from the sample surface. The intensity Ib of the bias beam 5 should make the frequency $\omega_{min}$ of the reflection valley just equal to the photon frequency ωe of the incident working beam 4. At that time the intensity of the reflected beam 6 is near zero, i.e., at the point 1 in FIG. 1. If the intensity Ib increases and the magnitude is large enough, then the reflection edge will move by a big margin so that the total reflection zone at the top of the reflection edge will move to the place ωe, As shown by point 2 in FIG. 1, at that time the intensity Ic of the reflected beam approaches the intensity Ie of the incident working beam 4.

If the switch beam is used, it may be incident from any direction smaller than the total reflection angle.

As shown in FIG. 4, when a thin sample is used, he working beam 4 irradiates the front of the sample, and the bias beam will be incident upon either the front or the rear directions 9 and 10 of sample. Incident angles should be all smaller than the total reflection angle. Reflected beam 6 is reflected from the frontal surface of the sample.

2. Reflective light modulator

When a thick sample is used, the arrangement of the three beams is the same as that of the reflective switching device. What is different is that the intensity Ib of the bias beam 5 should just make the frequency $\omega_1$ the maximum value of $dR/d_p$ equal to the photon frequency $\omega_e$ of the working beam 4, at which time the sensitivity of modulation is highest. The bias beam 5 is used to modulate the intensity of the reflected beam, and it forms the light power modulator by varying the power of the bias beam 5 to control a corresponding power variation of the reflected beam 6. When the modulating beam is adopted, $\omega_e$ should be the photon frequency of the modulating beam. When the modulating beam is not a laser beam but an infrared radiation with continuous spectrum, $\omega_e$ should be the peak frequency of the radiation power spectrum. The frequency and the incident direction of the modulating beam may be different from that of the background beam, but the two points are required not to vary, the incident angle must be smaller than the total reflection angle, its light spot must be larger than that of the working beam, and $\omega_1$ is slightly smaller $\omega_{min}$.

The power variation of the reflected beam may be larger, equal to, or smaller than that of the bias beam. This is related to the frequencies of the two beams, when the power variation of the reflected beam is larger than that of the bias beam. If a weak infrared radiation coming from outside is taken as an auxiliary beam, then the optical transistor becomes an infrared detector. For weak radiation from outside, the intensity of a reflected beam with a larger wavelength has a much greater variation.

It should be pointed out that when a thin sample is used in the way as shown in FIG. 4, the arrangement of the bias beam, the working beam and the reflected beam and the demand for the intensity of the bias beam are all the same as those of the reflective switch that adopts a thick sample. If the bias beam or the modulating beam radiates upon the back of the sample 3 via the substrate 8, such as an incidence from the direction 9, at that time the forbidden band width of substrate material restricts its maximum value of the photon energy. This means that the substrate is also a filter of the modulating beam, which has significant potential in practical applications.

3. Transmissive light switch

For a transmission light switch, the frequency of the reflection valley of the plasma oscillation reflection spectrum of the sample 3 equals the photon frequency of the incident working beam 4. When the intensity of the bias beam 5 is appropriately increased, the working beam will make an almost total reflection, and the intensity of the transmitted beam is nearly zero. A transmissive light switch is formed by varying the intensity of the bias beam to bring forth a great variation of the intensity of the transmitted beam.

When a thick sample is used, the working beam is incident along the normal direction of the frontal surface of the sample while the transmitted beam 7 emits along the normal direction of the back of sample. When the bias beam makes incidence from the inclined normal of the frontal surface of the sample, its intensity causes $\omega_{min}$ to be smaller than $\omega_e$, and the working beam intensity Ie penetrates the sample, slightly absorbed and only having reflection loss. The transmitted beam intensity can reach 0.6 Ie or more. After the bias beam is increased or a switch beam is added, Ie is close to the case of total reflection, and the intensity of the transmitted beam is near zero. If a reflection reducing coating is evaporated on the incident surface of the sample, then the reflection loss can be greatly reduced, and the transmitted beam intensity can reach 0.9 Ie or higher.

If a thin sample is used, the arrangement of the bias, working, and reflected beams is the same as that of the reflective light switch when a thick sample is used. The difference is that the incident direction of the bias beam may be along line 10 in FIG. 4 that first passes through the substrate and then comes to the back of the sample. Of course, the intensity of the bias beam must make $\omega_1$ equal to $\omega_e$. If the reflection reducing coating is evaporated on the incident surface of the sample, the reflection loss can be greatly reduced, but the bias beam must make incidence from the back direction of the substrate. When the bias beam intensity is increased to such an extent that the total reflection zone of the low frequency end of the reflection edge moves to $\omega_e$, owing to the drastic variation of the dielectric function, the reflection reducing coating will no longer be able to prevent the working beam from reflecting from the sample surface, so the intensity of transmitted light approaches zero.

Only an open forbidden band semiconductor can be used as a transmissive light switch.

4. Combined infrared detector

If in addition to a steady bias beam a monochromatic or a continuous coherent or incoherent infrared radiation also irradiates the sample 3 and produces the photocarriers, the intensity of the reflected beam will correspondingly vary greatly i.e., very high modulation sensitivity is reached. When $dI_c/dI_b \gg 1$, the existing photon detector or thermal detector receives the reflected beam 6, the bias beam 5 acts as the background beam and the infrared radiation to be measured acts as the auxiliary beam, thus composing a combined infrared detector. Here $dI_c$ is the variation of the intensity of the reflected beam caused by $dI_b$. The photon frequency of the infrared radiation to be measured may be the same as or different from the background beam. The detectivity of such a combined detector will be remarkably improved owing to the light amplification of infrared radiation by the optical transistor. Such a detector produces a compound noise level which is $(t_{pl} t_{pc})^{1/2}/l$ times that of a photo-conductive detector.

5. Multipurpose optical switch and optical modulator

The sample 3 of this invention can be either a thick sample or a thin sample. The thickness of a thin sample must be larger than the plasma absorption length, which is in most cases smaller than 100 μm. A thin sample is glued or epitaxially grown on the substrate 8 of a broad forbidden band semiconductor that can transmit the bias beam and the working beam. In this way, the bias beam not only can make incidence from the front of the sample, but also can emit along the directions 9 and 10 via the substrate onto the back of the sample. However, as the concentration of dark carrier of zero forbidden band semiconductor is high, it can be used only when the working wavelength is short. Moreover, the photon energy needed for producing interband transition in a zero forbidden band semiconductor is smaller than in an open forbidden band semiconductor. Therefore, for a similar short wavelength, the photon energy of the bias beam is lower when a zero forbidden band semiconductor is adopted.

Figure 6:
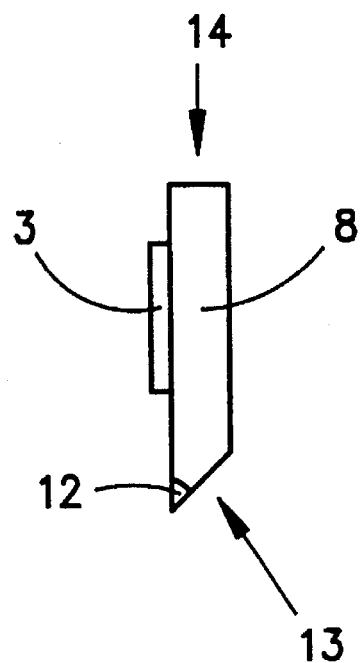
FIG. 6 is a diagram of an optical transistor where the bias beam is introduced from the normal directions 13 and 14 of the plane of an inclined surface and the opposite side of this lateral surface.

A set of opposite sides of the substrate in FIG. 5 are ground to inclined planes so that the angle 12 between the joint face of the substrate 8 and the sample 3 and the inclined plane is larger than the total reflection angle of the bias beam. However, it must be smaller than the total reflection angle on the boundary of the substrate 8 and the sample 3. Thereby a multipurpose optical transistor is formed as shown in FIG. 5, having the characteristic that the bias beam is incident to the substrate 8 from the normal directions 11 and 13 of the inclined plane and is repeatedly reflected between two boundaries. When the bias beam reaches to the boundary of the substrate and the sample, because their reflective indexes are close, it can transmit into the sample almost without reflection and then produce photo-carriers. In another embodiment, one side of a set of sides is ground to an inclined plane while the other side is maintained as a plane, as shown in FIG. 6. Then the bias beam can make incidence from the normal direction 13 of the inclined plane or from the normal direction 14 of the plane opposite to the inclined plane.

A more convenient and effective method occurs where the semiconductor lasers are grown on the incident plane of the bias beam, one acting as the background beam and another as the switch beam or the modulating beam.

The optical transistor shown in FIG. 5 has multiple functions as described above. It is an integrated optoelectronic device.

Figure 7:
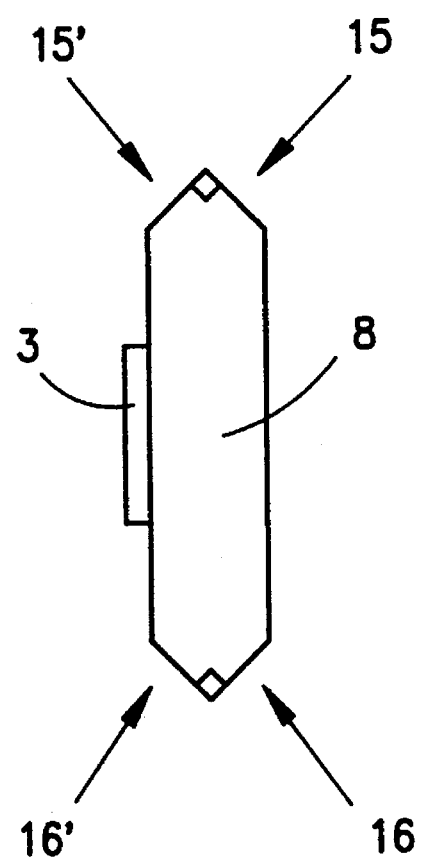
FIG. 7 is a diagram of an optical transistor, whose substrate has a wedge-shaped lateral surface.

Another design is shown in FIG. 7. A set of opposite sides are ground to a wedge shaped composed by two planes perpendicular to each other. The normal directions 15, 15', 16 and 16' of various wedge-shape planes are the incident direction of the background light and the auxiliary light respectively or are used for the growth of semiconductor lasers to supply the background beam and the auxiliary beam. The two planes 15 and 15' or 16 and 16' perpendicular to each other compose a cube corner reflector for the bias beam and ensure repeated reflections and final absorption by the sample 3.

6. Spectral scanner

If the background beam intensity varies according to a sawtooth wave, sine wave or a square wave, the position of the reflection edge will move correspondingly and regularly. For the working beam with a continuous spectrum, the optical transistor will regularly modulate its corresponding frequency component and give out interesting results. For example, when the intensity of the background beam varies by way of a linear sawtooth wave and is added with the modulating beam, the modulated portion of the output beam will be proportional to the intensity of the working beam in the frequency range of the reflection edge. Then the optical transistor functions like a frequency scanning instrument or a spectrograph. It can give out the spectrum of the intensity of the working beam, and its resolution is the frequency width of the reflection edge.

This invention has the following positive results:

1. The optical transistor provided by this invention has at least three functions, e.g., high speed optical modulation, optical switching and optical detection. It is simple to manufacture and convenient in operation.

2. In applications of this invention discrete elements can be used and the optical modulation, optical amplification and optical detection can also be realized in an optical integrated circuit. This optical transistor can work in vacuum, gas, liquid or solid medium, and also can work at low temperature or room temperature. The bias beam and the working beam can propagate or transfer. The bias beam and the working beam can propagate or transfer through the above media or optical fiber.

3. When this optical transistor is equipped with certain modes of the background beam and the working beam, a spectral scanner can be composed.

4. When semiconductor lasers are grown on the inclined plane of the substrate of the optical transistor, an integrated optoelectronic device with light source can be composed.

5. When the reflected beam of this optical transistor projects onto an ordinary detector, a combined infrared detector can be composed. The sensitive function of power modulation of this optical transistor makes it resemble an optical preamplifier. The theoretical limit value of the detectivity of the combined detector on the compound noise is $(t_{pl} t_{pc})^{1/2}/l$ times that of an photoconductive detector, where, $t_{pl}$ and $t_{pc}$ are respectively the thickness of the sample of optical transistor and the thickness of a photoconductive detector, and $l$ is the plasma absorption length.

Table 1 presents the phonon and energy band parameters of HgCdTe (x=0.2) and HgSe at 77K, where $\Delta$ is revolution-track fissure, $E_g$ is the width of the forbidden band, and P is the momentum matrix element.

Table 2 shows the reflection spectrum parameters, the electric parameters, and the modulation magnification $\beta$ of light intensity of the optical transistor of HgCdTe(x=0.2) and HgSe at 77K. $\omega$ is the frequency where the maximum value of $dR/d_p$ lies, the value of $\beta$ is calculated at $\omega=\omega_1$ according to expression (4), and the parameters used in calculation are: $A=1\times10^{-2}$ cm$^{-2}$, $d=1\times10^{-4}$ cm, $\eta=0.7$, $\tau=5\times10^{-6}$s, $I_e=1\times10^{-3}$W, $\lambda_1=2\pi c/\omega_1$, $\lambda_b=hc/Ef(HgSe)$ or $\lambda_b=hc/(Eg+Ef)(HeCdTe)$, c is light speed in vacuum, h the Plank's constant, $E_g$ the width of the forbidden band, $E_f$ the Fermi level, $m_f$ the effective mass on the Fermi plane, $\mu$ the transition rate, and $m_o$ the free electron mass.

Table 3 presents the modulation and switch characteristics of the optical transistor made of HgCdTe(x=0.2) and HgSe materials at 77K.

TABLE 1

|  | HgSe |  |  | HgCdTe |  |  |
|---|---|---|---|---|---|---|
| $\omega_j$ (cm$^{-1}$) | 132 | 120 | 111 | 154.86 | 125.22 | 111.66 |
| Sj | 7 | 0.5 | 0.5 | 0.211 | 3.27 | 0.44 |
| $\Gamma j$ (cm$^{-1}$) | 5 | 4 | 5 | 8.05 | 6.2 | 7.6 |
| $\epsilon_\infty$ | 12.5 |  |  | 12.6 |  |  |
| $\omega p$ (cm$^{-1}$) | 940 |  |  | 125 |  |  |
| $\Delta$ (ev) | 0.4 |  |  | 1.0 |  |  |
| Eg (ev) | −0.20 |  |  | 0.0939 |  |  |
| P (10$^{-8}$ ev.cm) | 7.5 |  |  | 8.0 |  |  |

TABLE 2

|  | HgCdTe |  | HgSe |  |  |
|---|---|---|---|---|---|
| $\omega_1$ (cm$^{-1}$) | 84.2 | 203 | 943.4 | 2000 | 2770 |
| $\lambda_1$ (μm) | 118.8 | 49.3 | 10.5 | 5 | 3.6 |
| $\frac{dR}{d\omega_p}\|_{max}$ (% cm) | 4.06 | 4.68 | 2.00 | 1.16 | 0.92 |
| $\omega$min (cm$^{-1}$) | 90 | 214 | 989 | 2094 | 2898 |
| Rmin (10$^{-3}$) | 14.4 | 15.8 | 4.31 | 2.76 | 2.27 |
| $\omega$p (cm$^{-1}$) | 109 | 184 | 940 | 2001 | 2770 |
| Ne (10$^{18}$ cm$^{-3}$) | 0.0225 | 0.0824 | 7.868 | 72.25 | 190.0 |
| Eg (ev) | 0.0939 | 0.0939 | −0.20 | −0.20 | −0.20 |
| Ef (ev) | 0.0246 | 0.0521 | 0.329 | 0.817 | 1.18 |
| $\lambda$b (μm) | 10.5 | 8.49 | 3.77 | 1.52 | 1.05 |
| $\gamma$p (cm$^{-1}$) | 10 | 10 | 24 | 40 | 50 |
| $m_f$ ($m_o$) | 0.0120 | 0.0164 | 0.0653 | 0.133 | 0.182 |
| $\mu$ (10$^3$ cm$^2$/SV) | 77.8 | 56.9 | 5.95 | 1.76 | 1.02 |
| Ie (mw) | 100 | 20 | 20 | 500 | 500 |
| $\beta$ | 1812 | 156 | 1.59 | 2.15 | 0.62 |

TABLE 3

|  | HgCdTe |  | HgSe |  |  |
|---|---|---|---|---|---|
| R ($\omega$min) = Rmin |  |  |  |  |  |
| $\omega$min (cm$^{-1}$) | 90 | 214 | 989 | 2094 | 2898 |
| Rmin (10$^{-3}$) | 14.4 | 15.8 | 4.31 | 2.76 | 2.27 |
| $\omega$p (cm$^{-1}$) | 109 | 184 | 940 | 2001 | 2770 |
| Ne (10$^{18}$ cm$^{-3}$) | 0.0254 | 0.0824 | 7.868 | 72.25 | 190.0 |
| R ($\omega$min) = 90% |  |  |  |  |  |
| $\omega$p (cm$^{-1}$) | 164 | 243 | 1098 | 2288 | 3140 |
| Ne (10$^{18}$ cm$^{-3}$) | 0.0610 | 0.171 | 12.35 | 107.6 | 276.2 |
| $\Delta$Ne (10$^{18}$ cm$^{-3}$) | 0.0356 | 0.0884 | 4.48 | 35.4 | 86.2 |
| $\Delta$Ib (mw) | 0.192 | 0.590 | 674 | 1320 | 4650 |
| dR ($\omega_1$) = 1% |  |  |  |  |  |
| dNe (10$^{14}$ cm$^{-3}$) | 1.02 | 1.91 | 83.7 | 623 | 1490 |
| dIb (μw) | 0.549 | 1.28 | 126 | 2325 | 8038 |

I claim:

1. An optical transistor comprising:

a sample of semiconductor material for receiving an incident light beam having a frequency in an infrared wave band, said semiconductor material having a concentration of carriers sufficient to output said incident light beam as an output beam;

a light source for producing a bias beam to irradiate a spot on the sample and thereby excite said carriers to move and maintain a plasma oscillation reflection edge of the sample at a desired frequency position, wherein said bias beam comprises incoherent light with a continuous spectrum; and another light source for producing a laser beam as a working beam which irradiates the sample within the spot produced by the bias beam, the plasma oscillation reflection edge of the sample having a frequency characteristic such that an intensity variation of the bias beam produces an intensity modulation of said output beam.

2. An optical transistor according to claim 1, wherein a photon frequency of the incident working beam is equal to a frequency at which a change in reflectivity of the sample with respect to a plasma frequency reaches a maximum value on the plasma reflection edge, and the power of the bias beam is varied to modulate the power of the output beam, thereby forming a light power modulator.

3. An optical transistor according to claim 1, wherein
a frequency at a valley of a reflection spectrum of the plasma oscillation of the sample is equal to a photon frequency of the incident working beam; and
the intensity of the bias beam is increased so that the intensity of said output beam increases from an attenuated value determined by the reflection valley to an increased value approaching that of the working beam to provide a reflective light switch.

4. An optical transistor according to claim 1, wherein
a frequency at a valley of the reflection spectrum of the plasma oscillation of the sample is equal to a photon frequency of the incident working beam; and
the intensity of the bias beam is increased so that the intensity of a beam reflected by said sample increases from an attenuated value determined by the reflection valley to an increased value approaching that of the working beam, and the output beam is transmitted through said semiconductor material to provide a transmissive light switch.

5. An optical transistor according to claim 1 wherein a wavelength of the bias beam is within a wave band ranging from visible light to infrared light, and the bias beam further comprises a beam of light with an intensity switched between a lower intensity which moves and maintains the plasma oscillation reflection edge of the sample at a desired frequency, and a higher intensity which modulates the output beam.

6. An optical transistor according to claim 1 wherein a wavelength of the bias beam is within a wave band ranging from visible light to infrared light, and the bias beam further comprises a beam of light with an intensity switching between a lower intensity which moves and maintains the plasma oscillation reflection edge of the sample at a desired frequency, and a higher intensity which switches the output beam.

7. An optical transistor according to claim 1 wherein a wavelength of the bias beam is within a wave band ranging from visible light to infrared light, and the bias beam further comprises:
a background beam to move and maintain the plasma oscillation reflection edge of the sample at a desired frequency; and
an auxiliary beam to modulate the output beam.

8. An optical transistor according to claim 7, wherein a photon frequency of the background beam is different from a photon frequency of the auxiliary beam.

9. An optical transistor according to claim 1 wherein a wavelength of the bias beam is within a wave band ranging from visible light to infrared light, and the bias beam further comprises:
a background beam used to move and maintain the plasma oscillation reflection edge of the sample at a desired frequency; and
an auxiliary beam to switch the output beam on and off.

10. An optical transistor according to claim 9, wherein a photon frequency of the background beam is different from a photon frequency of the auxiliary beam.

11. An optical transistor according to claim 1, wherein a detector receives the output beam, and the bias beam comprises a background beam which moves the plasma oscillation reflection edge of the sample, so that a combined detector is formed to measure variations in an input auxiliary beam.

12. An optical transistor according to claim 1, wherein the working beam comprises a range of frequencies, the intensity of the bias beam changes as a linear sawtooth wave and an auxiliary beam modulates the output beam so that a modulated frequency of the output beam is proportional to the intensity of the working beam within the frequency range of the reflection edge thereby forming a spectral scanner which produces a frequency spectrum of light intensity of the working beam.

13. An optical transistor according to claim 1, wherein the sample has a thickness larger than a plasma absorption length, said sample being attached to a semiconductor substrate having a relatively broad forbidden band, and the bias beam and working beam are transmitted through a junction between the sample and the substrate.

14. An optical transistor according to claim 13, wherein one lateral surface on the substrate is ground to a slope such that the angle between the slope and a bonding plane between the substrate and the sample is greater than a total reflection angle of the bias beam but smaller than a total reflection angle on the boundary of the substrate and the sample, and the bias beam is incident to the substrate perpendicular to the slope surface.

15. An optical transistor according to claim 13, wherein one lateral surface on the substrate is ground to a slope such that the angle between the slope and a bonding plane between the substrate and the sample is greater than a total reflection angle of the bias beam but smaller than a total reflection angle on the boundary of the substrate and the sample, and the bias beam is incident perpendicular to a surface of the substrate opposite to the slope surface.

16. An optical transistor according to claim 13, wherein two opposite lateral surfaces on the substrate are ground to a slope such that an angle between the slope and a bonding plane between the substrate and the sample is greater than a total reflection angle of the bias beam but smaller than a total reflection angle on the boundary of the substrate and the sample, and the bias beam is incident to the substrate perpendicular to a surface of the slope.

17. An optical transistor according to claim 16, wherein a semiconductor laser is grown on a plane of opposite sides of the substrate to supply the bias beam.

18. An optical transistor according to claim 13, wherein two opposite lateral surfaces of the substrate are ground to a wedge having two perpendicular planes, and wherein the bias beam comprises a background beam to maintain the plasma oscillation reflection edge of the sample at a desired frequency, and an auxiliary beam to modulate the output beam, the background beam and the auxiliary beam being incident normal to the planes of the wedges.

19. An optical transistor comprising:
a sample of semiconductor material for receiving an incident light beam having a frequency in an infrared wave band, said semiconductor material having a concentration of carriers sufficient to output said incident light beam as an output beam;
a light source for producing a bias beam to irradiate a spot on the sample and thereby excite said carriers to move and maintain a plasma oscillation reflection edge of the sample at a desired frequency position; and
another light source for producing a laser beam as a working beam which irradiates the sample within the spot produced by the bias beam, the plasma oscillation reflection edge of the sample having a frequency characteristic such that an intensity variation of the bias beam produces an intensity modulation of said output beam, wherein the sample has a thickness larger than a plasma absorption length, said sample being attached to a semiconductor substrate having a relatively broad forbidden band, and the bias beam and working beam are transmitted through a junction between the sample and the substrate, one lateral surface on the substrate being ground to a slope such that the angle between the slope and a bonding plane between the substrate and the sample is greater than a total reflection angle of the bias beam but smaller than a total reflection angle on the boundary of the substrate and the sample, and the bias beam is incident to the substrate perpendicular to the slope surface.

20. An optical transistor according to claim 19, wherein said bias beam comprises coherent light.

21. An optical transistor comprising:

a sample of semiconductor material for receiving an incident light beam having a frequency in an infrared wave band, said semiconductor material having a concentration of carriers sufficient to output said incident light beam as an output beam;

a light source for producing a bias beam to irradiate a spot on the sample and thereby excite said carriers to move and maintain a plasma oscillation reflection edge of the sample at a desired frequency position; and another light source for producing a laser beam as a working beam which irradiates the sample within the spot produced by the bias beam, the plasma oscillation reflection edge of the sample having a frequency characteristic such that an intensity variation of the bias beam produces an intensity modulation of said output beam, wherein the sample has a thickness larger than a plasma absorption length, said sample being attached to a semiconductor substrate having a relatively broad forbidden band, and the bias beam and working beam are transmitted through a junction between the sample and the substrate, two opposite lateral surfaces of the substrate being ground to a wedge having two perpendicular planes, and wherein the bias beam comprises a background beam to maintain the plasma oscillation reflection edge of the sample at a desired frequency, and an auxiliary beam to modulate the output beam, the background beam and the auxiliary beam being incident normal to the planes of the wedges.

22. An optical transistor comprising:

a sample of semiconductor material for receiving an incident light beam having a frequency in an infrared wave band, said semiconductor material having a concentration of carriers sufficient to output said incident light beam as an output beam;

a light source for producing a bias beam to irradiate a spot on the sample and thereby excite said carriers to move and maintain a plasma oscillation reflection edge of the sample at a desired frequency position; and another light source for producing a laser beam as a working beam which irradiates the sample within the spot produced by the bias beam, the plasma oscillation reflection edge of the sample having a frequency characteristic such that an intensity variation of the bias beam produces an intensity modulation of said output beam, wherein the sample has a thickness larger than a plasma absorption length, said sample being attached to a semiconductor substrate having a relatively broad forbidden band, and the bias beam and working beam are transmitted through a junction between the sample and the substrate, two opposite lateral surfaces on the substrate being ground to a slope such that an angle between the slope and a bonding plane between the substrate and the sample is greater than a total reflection angle of the bias beam but smaller than a total reflection angle on the boundary of the substrate and the sample, the bias beam being incident to the substrate perpendicular to a surface of the slope, and a semiconductor laser being grown on a plane of opposite sides of the substrate to supply the bias beam.

* * * * *